United States Patent
Kang et al.

(10) Patent No.: US 10,078,848 B2
(45) Date of Patent: Sep. 18, 2018

(54) METHOD OF OPERATING NEARBY FUNCTION AND ELECTRONIC DEVICE SUPPORTING THE SAME

(71) Applicant: Samsung Electronics Co., Ltd., Suwon-si, Gyeonggi-do (KR)

(72) Inventors: Hyuk Kang, Yongin-si (KR); Gibeom Kim, Seongnam-si (KR); Hyunchul Choi, Seoul (KR); Hyeongseok Kim, Seoul (KR); Taehun Lim, Gwacheon-si (KR); Dukki Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1005 days.

(21) Appl. No.: 14/511,666

(22) Filed: Oct. 10, 2014

(65) Prior Publication Data

US 2015/0106175 A1    Apr. 16, 2015

(30) Foreign Application Priority Data

Oct. 10, 2013    (KR) .................. 10-2013-0120312

(51) Int. Cl.
*G06Q 30/02* (2012.01)
*H04W 4/80* (2018.01)

(52) U.S. Cl.
CPC .......... *G06Q 30/0241* (2013.01); *H04W 4/80* (2018.02); *Y02D 70/1224* (2018.01);
(Continued)

(58) Field of Classification Search
CPC ..................................................... G06Q 30/02
See application file for complete search history.

(56) References Cited

U.S. PATENT DOCUMENTS

2004/0176032 A1    9/2004    Kotola et al.
2007/0184820 A1*   8/2007    Marshall ............... G06Q 30/02
                                                    455/414.3
(Continued)

FOREIGN PATENT DOCUMENTS

KR    10-2006-0033558 A1    4/2006
KR    10-2006-0037796 A1    5/2006
KR    10-2011-0049121 A1    5/2011

OTHER PUBLICATIONS

Bluetooth Specification Version 4.0, Bluetooth SIG, vol. 3, p. 375, Jun. 30, 2010.

*Primary Examiner* — Vincent M Cao
(74) *Attorney, Agent, or Firm* — Jefferson IP Law, LLP

(57) ABSTRACT

An electronic device and a method of operating a nearby function of the electronic device is provided. The electronic device includes a low-power short-range communication module configured to perform a scanning operation and to collect advertising information as a result of the scanning operation, a display module configured to display an item for performing at least one of a short range communication connection and a remote communication connection with at least one reception-side device corresponding to the collected advertising information, and a control module configured to control the scanning operation of the low-power short-range communication module and the displaying of the item for performing the at least one of the short range communication connection and the remote communication connection with the at least one reception-side device corresponding to the collected advertising information.

16 Claims, 10 Drawing Sheets

(52) U.S. Cl.
CPC ........ *Y02D 70/1262* (2018.01); *Y02D 70/142* (2018.01); *Y02D 70/144* (2018.01); *Y02D 70/162* (2018.01); *Y02D 70/164* (2018.01); *Y02D 70/168* (2018.01); *Y02D 70/26* (2018.01)

(56) References Cited

U.S. PATENT DOCUMENTS

| | | | |
|---|---|---|---|
| 2008/0003946 A1 | 1/2008 | Lee et al. | |
| 2008/0109317 A1* | 5/2008 | Singh | G06Q 30/02 705/14.5 |
| 2011/0107117 A1 | 5/2011 | Jung et al. | |
| 2011/0145417 A1 | 6/2011 | Tamura | |
| 2012/0284297 A1* | 11/2012 | Aguera-Arcas | G06F 21/629 707/769 |
| 2013/0231043 A1* | 9/2013 | Tawfiq Moshtaha | G06Q 30/02 455/3.01 |

* cited by examiner

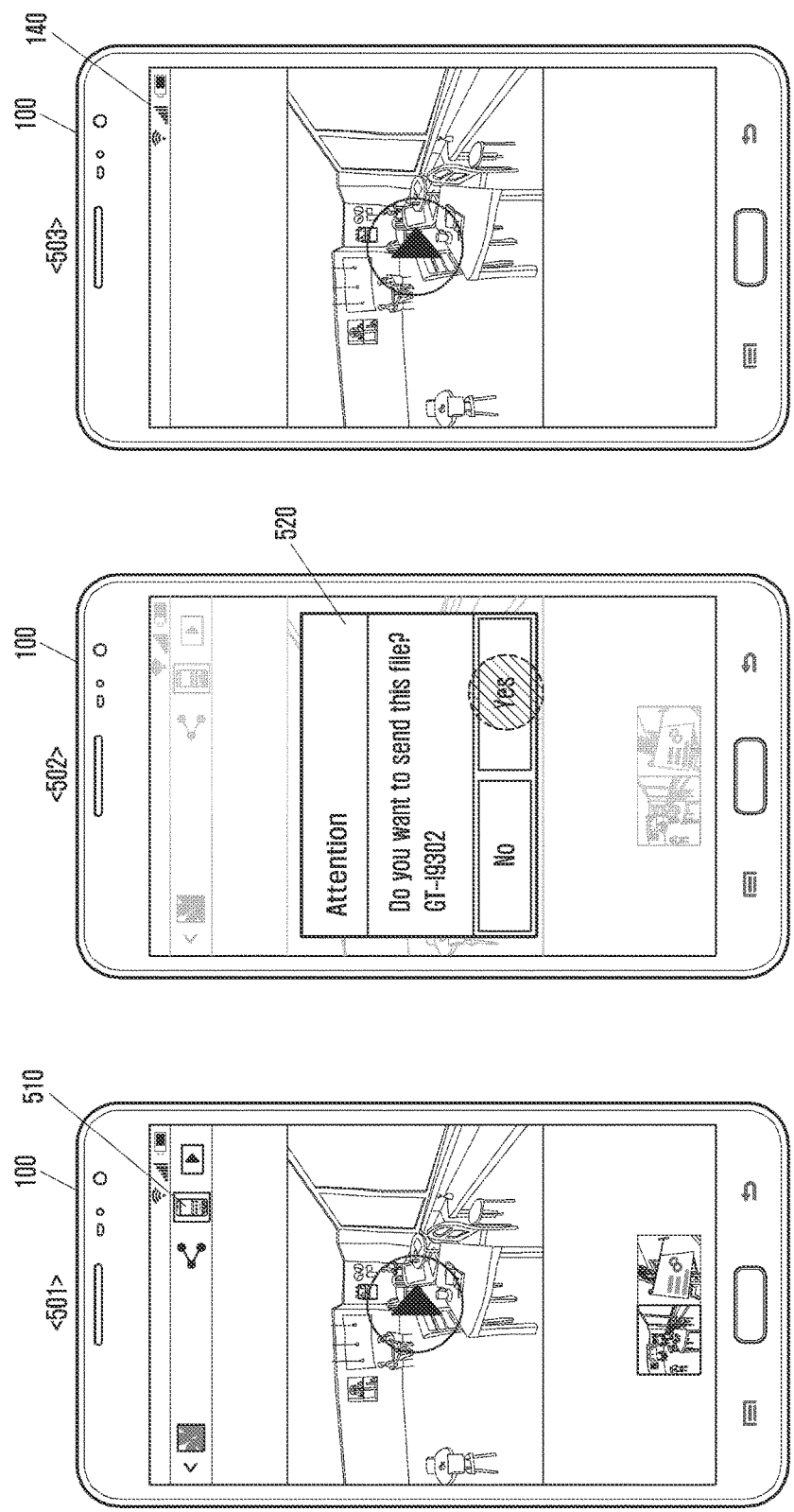

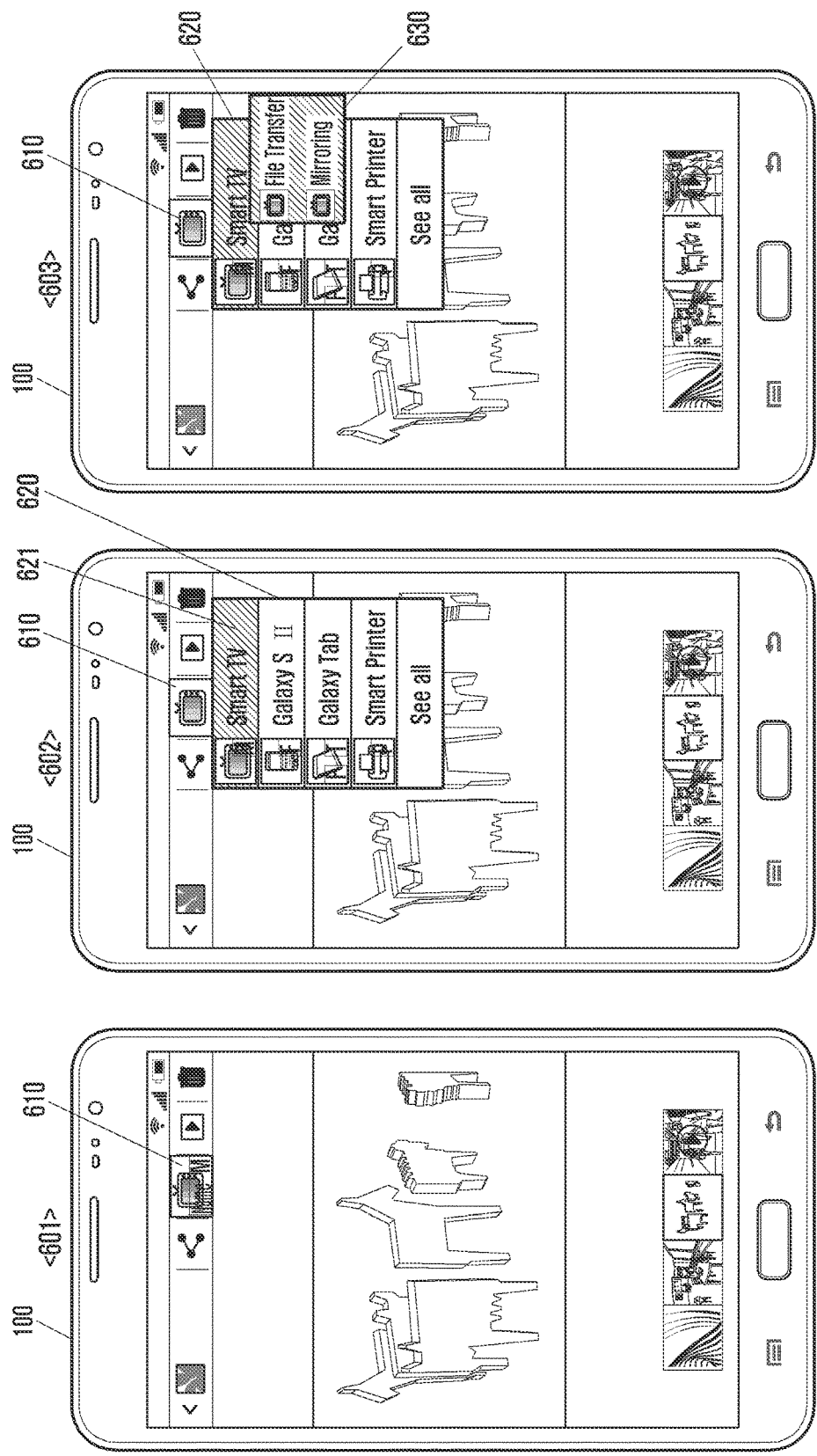

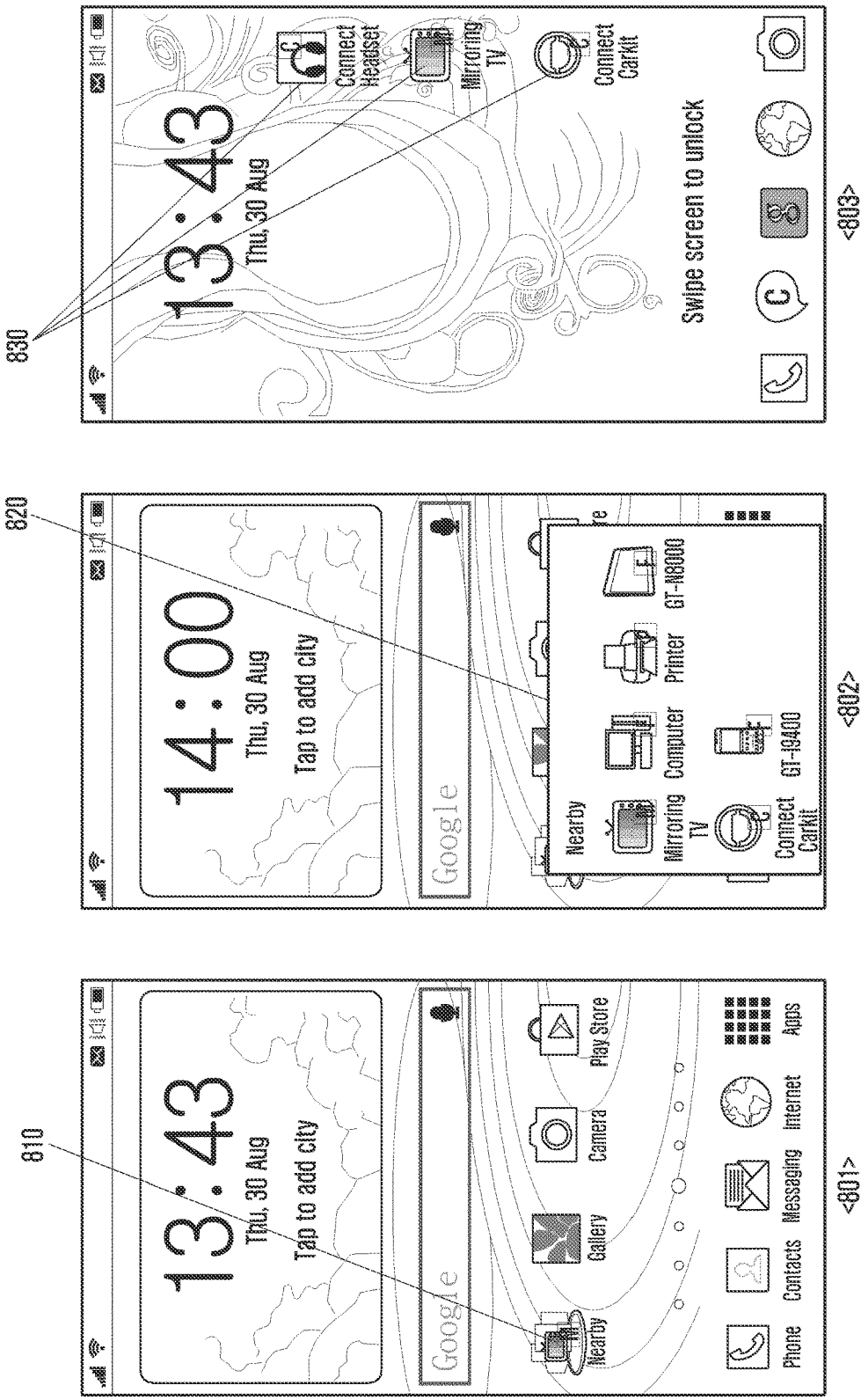

FIG. 9

| Device Category | Service List | Default Service |
|---|---|---|
| Smart Phone | File Transfer [F], Tethering [T], Multi-Game [G] | File Transfer |
| Smart TV | File Transfer [F], Mirroring [M], Streaming [S], DLNA [D] | Mirroring |
| Tablet | File Transfer [F], Tethering [T], Multi-Game [G], DLNA [D] | File Transfer |
| PC | File Transfer [F], Tethering [T], Multi-Game [G], DLNA [D] | File Transfer |
| Printer, Camera | File Transfer [F], Remote Preview [R] | File Transfer |
| Carkit | BT Connect [C], Mirroring [M], Streaming [S], Tethering [T] | BT Connect |
| Accessory (Headset, Keyboard) | Classic BT Connect via BLE [C] | BT Connect |
| Others | BT Connect [C] | |

METHOD OF OPERATING NEARBY FUNCTION AND ELECTRONIC DEVICE SUPPORTING THE SAME

CROSS-REFERENCE TO RELATED APPLICATION(S)

This application claims the benefit under 35 U.S.C. § 119(a) of Korean patent application filed on Oct. 10, 2013 and assigned Serial number 10-2013-0120312, the entire disclosure of which is hereby incorporated by reference.

TECHNICAL FIELD

The present disclosure relates to operating a function between an electronic device and a neighboring device.

BACKGROUND

Some electronic devices have a communication function and are manufactured to be small enough to carry. Recently, such electronic devices are growing in number with the support of hardware and software innovations.

These electronic devices, in the related art, provide a short-range wireless communication connection function such as Bluetooth (BT), etc. This wireless communication function requires, for example, processes of selecting content, selecting a communication method, scanning devices according to the selected communication method, identifying and selecting a specific device in the scanned list, requesting a connection, receiving an acknowledgement of the request, establishing a communication channel, transmitting the content, and the like. In this way, the electronic devices of the related art require complex steps to be performed by users for the use of the wireless communication connection function. As a result, users find it inconvenient to use the wireless communication connection function of the electronic device.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and are to provide at least the advantages described below. Accordingly, an aspect of the present disclosure is to provide an electronic device that can operate with lower power using a more simplified method, and a method of operating a nearby function of the electronic device.

In accordance with an aspect of the present disclosure, an electronic device is provided. The electronic device includes a low-power short-range communication module configured to perform a scanning operation and to collect advertising information as a result of the scanning operation, a display module configured to display an item for performing at least one of a short range communication connection and a remote communication connection with at least one reception-side device corresponding to the collected advertising information, and a control module configured to control the scanning operation of the low-power short-range communication module and the displaying of the item for performing the at least one of the short range communication connection and the remote communication connection with the at least one reception-side device corresponding to the collected advertising information.

In accordance with another aspect of the present disclosure, a method of an electronic device for operating a nearby function is provided. The method includes performing, by a low-power short-range communication module of the electronic device, a scanning operation, collecting advertising information as a result of the scanning operation, and displaying an item for performing at least one of a short range communication connection and a remote communication connection with at least one reception-side device corresponding to the collected advertising information.

As described above, the present disclosure provides a method of operating a nearby function and an electronic device supporting the same, which can operate the nearby function in a more simplified manner.

Furthermore, according to embodiments of the present disclosure, power usability can be improved based on a low-power operation.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 5 illustrates an example of a screen for explaining a situation in which a nearby function is operated in an electronic device according to an embodiment of the present disclosure;

FIG. 6 illustrates examples of a screen for explaining a display of a nearby function item for each reception-side device according to an embodiment of the present disclosure;

FIG. 8 illustrates examples of a screen for explaining a display of a nearby function item according to an embodiment of the present disclosure; and FIG. 9 illustrates an example of a nearby function for each of reception-side devices according to an embodiment of the present disclosure.

Throughout the drawings, it should be noted that like reference numbers are used to depict the same or similar elements, features, and structures.

DETAILED DESCRIPTION

Figure 1:
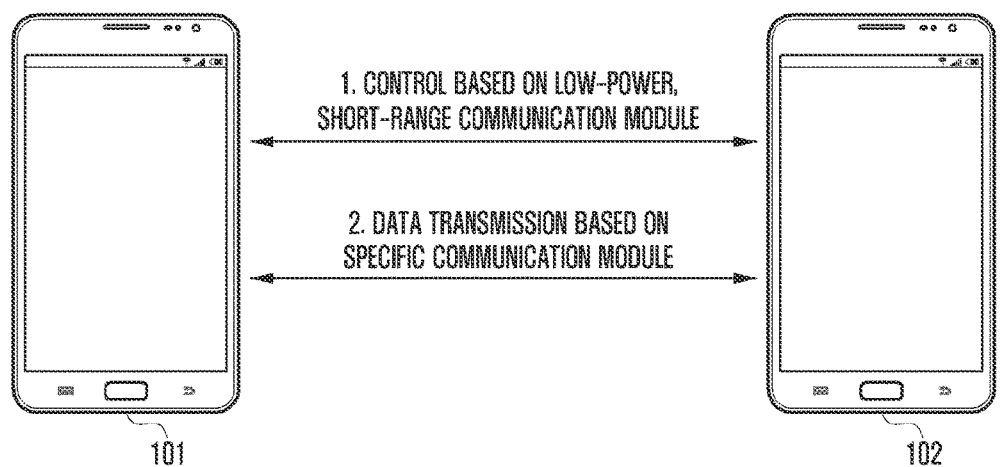
FIG. 1 schematically illustrates an example of a configuration of a system for operating a nearby function according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

An electronic device according to the present disclosure may be a device including a communication function. For example, the electronic device may be one or a combination of a smart phone, a tablet Personal Computer (PC), a mobile phone, a video phone, an e-book reader, a desktop PC, a laptop PC, a netbook computer, a Personal Digital Assistant (PDA), a Portable Multimedia Player (PMP), an MP3 player, a mobile medical device, an electronic bracelet, an electronic necklace, an electronic appcessory, a camera, a wearable device, an electronic clock, a wrist watch, a home appliance (for example, refrigerator, air conditioner, cleaner, an artificial intelligence robot, a television (TV), a Digital Versatile Disk (DVD) player, an audio player, oven, microwave oven, washing machine, air cleaner, and electronic picture frames), various types of medical devices (for example, Magnetic Resonance Angiography (MRA), Magnetic Resonance Imaging (MRI), Computed Tomography (CT), scanner, an ultrasonic device, and the like), a navigation device, a Global Positioning System (GPS) receiver, an Event Data Recorder (EDR), a Flight Data Recorder (FDR), a set-top box, a TV box (for example, Samsung HomeSync™, Apple TV™, or Google TV™), an electronic dictionary, a vehicle infotainment device, electronic equipment for a ship (for example, a navigation device for ship, a gyro compass, and the like), avionics, a security device, electronic clothes, an electronic key, a camcorder, game consoles, a Head-Mounted Display (HMD), a flat panel display device, an electronic frame, an electronic album, furniture or a part of buildings/structures having a communication function, an electronic board, an electronic signature receiving device, a wearable device, and a projector. It is obvious to those skilled in the art that the electronic device according to the present disclosure is not limited to the aforementioned devices.

FIG. 1 schematically illustrates an example of a configuration of a system for operating a nearby function according an embodiment of the present disclosure. Although two devices are illustrated in FIG. 1 for a description of the system for operating the nearby function, the present disclosure is not limited thereto. That is, the system for operating the nearby function according to the present disclosure may include many more devices disposed within a predetermined range, and among them, a specific device as a transmission-side device may establish a connection for wireless communication with one of reception-side devices.

Referring to FIG. 1, a system 10 for operating a nearby function is illustrated, the system 10 may include a transmission-side device 101 and a reception-side device 102.

The transmission-side device 101 may scan at least one reception-side device based on a low-power short-range communication module. The transmission-side device 101 may establish a channel for communication with one reception-side device 102 of the at least one reception-side device scanned based on the low-power short-range communication module. Thereafter, based on the established communication channel, the transmission-side device 101 may support transmission or sharing of content requested by a user. For the scanning and the control of the reception-side device 102, the transmission-side device 101 may include the low-power short-range communication module, and for the transmission of the content, the transmission-side device 101 may include a short range communication module different from the low-power short-range communication module, and a remote communication module. This allows control based on the low-power short-range communication module (see item 1 of FIG. 1).

The transmission-side device 101 may diversify a point in time when the low-power short-range communication module is operated. In addition, at a predetermined point in time during configuration for an operation of a nearby function, the transmission-side device 101 may scan the reception-side device 102 therearound through background processing and output (e.g., display) a nearby-device item on a display module using the nearby function.

The transmission-side device 101 may prepare in advance a white list in the process of scanning the at least one reception-side device based on the low-power short-range communication module, and may scan the at least one reception-side device based on the white list. Here, the white list may be information configured such that only the specific reception-side devices may be scanned based on at least some of a characteristic, a type, or a name of the at least one reception-side device.

For example, the white list may be defined as a specific device such as a portable smart phone device. The white list may include information configured such that only the reception-side devices are scanned which use a specific protocol determined by the transmission-side device 101 or the same protocol as communication modules that the transmission-side device 101 can operate. This allows communication (e.g., data transmission) between the transmission-side device 101 and the reception-side device 102 based on a specific communication module (see item 2 of FIG. 1). The white list may include information configured such that only the reception-side devices are scanned which provides a specific type of service information. The white list may include information configured such that only the reception-side devices are scanned which have a specific Social Networking Service (SNS) account or are registered in a phone book.

The transmission-side device 101 may scan devices based on the low-power short-range communication module, for example, a Bluetooth Low Energy (BLE) type communication module. At this time, the transmission-side device 101 may neglect a connection request sent by an unpermitted reception-side device, using the above-described white list. The white list may be arbitrarily designated by a user. Furthermore, the white list may also be configured such that specific devices are excluded or only the specific devices are scanned based on the previous scanning history.

In operating the low-power short-range communication module, the transmission-side device 101 may restrict a scanning range to a predetermined Received Signal Strength Indicator (RSSI) range. Based on this, the transmission-side device 101 does not scan devices beyond a predetermined distance to exclude the scanning for reception-side devices disposed beyond the predetermined distance from a current location.

The reception-side device 102 may maintain a low-power short-range communication module in an activated state to support the operation of the nearby function of the present disclosure, and when receiving a scanning signal from the transmission-side device 101, may transmit advertising information corresponding to the scanning signal. The advertising information may include information on a distance between the transmission-side device 101 and the reception-side device 102, information on a current state of the reception-side device 102, and the like. In particular, the reception-side device 102 may be equipped with the low-power short-range communication module, for example, a BLE type communication module, and may use a connectable undirected advertising packet for the transmission of the advertising information. The reception-side device 102 may be designed to respond to the scanning signal of the transmission-side device 101 with the advertising information at a predetermined interval using the low-power short-range communication module even while the corresponding device is in a sleep state so that electrical power of a control module thereof is restricted. The predetermined interval may be made short while the reception-side device 102 is being moved a long distance in the sleep state. The reception-side device 102 may include at least one motion sensor to identify the moving state thereof.

The advertising range of the reception-side device 102 may be wider than the scanning range of the transmission-side device 101. Accordingly, a plurality of reception-side devices may be arranged such that, in the process of outputting/displaying the advertising information, only the reception-side devices within a predetermined range with respect to the transmission-side device 101 respond to the scanning signal of the transmission-side device 101 with the advertising information.

Meanwhile, for the advertising information operated by the reception-side device 102, an amount of information of a packet may be restricted to, for example, predetermined bytes. In this case, the transmission-side device 101 may request additional information from the reception-side device, and the reception-side device 102 may provide the additional information as the advertising information in response to the request. At this time, the processing of the transmitted and received additional information may be performed on a link layer of the low-power short range communication module between the transmission-side device 101 and the reception-side device 102. Accordingly, the system 10 for operating the nearby function minimizes intervention of the control modules of the respective devices to restrain an unnecessary wake-up event of the control modules from occurring and reduce power consumption according to the wake-up event. The additional information may be information that the transmission-side device 101 requires in order to configure the nearby-device item. For example, the additional information may be information on functions that the reception-side device 102 can support.

The aforementioned system 10 for operating the nearby function allows the transmission-side device 101 to scan the reception-side devices within the predetermined RSSI range to control the reception-side device 102 remotely or to transfer content to the reception-side device 102. At this time, only the specific reception-side device 102 may be scanned by the transmission-side device 101 according to requirements for operating the white list and the same protocol configured in the transmission-side device 101. The reception-side device 102, when receiving a connection request of the transmission-side device 101, may determine a permission of the connection according to a user control in response to the request and accordingly, establish a communication connection with the transmission-side device 101.

When a plurality of reception-side devices are scanned, the transmission-side device 101 may sequentially transmit a remote control signal or content to the plurality of reception-side devices, in which case the transmission-side device 101 may individually request the communication connection with the respective reception-side devices using a BLE communication module. The transmission-side device 101, when a communication channel for control or a communication channel for content transmission is established, may execute a notification bar, a quick panel notification, or the like depending on the communication channel. At this time, the transmission-side device 101 may allow items for disconnection, cancel, rejection, filtering, or the like to be included in the corresponding screen interface.

Figure 2:
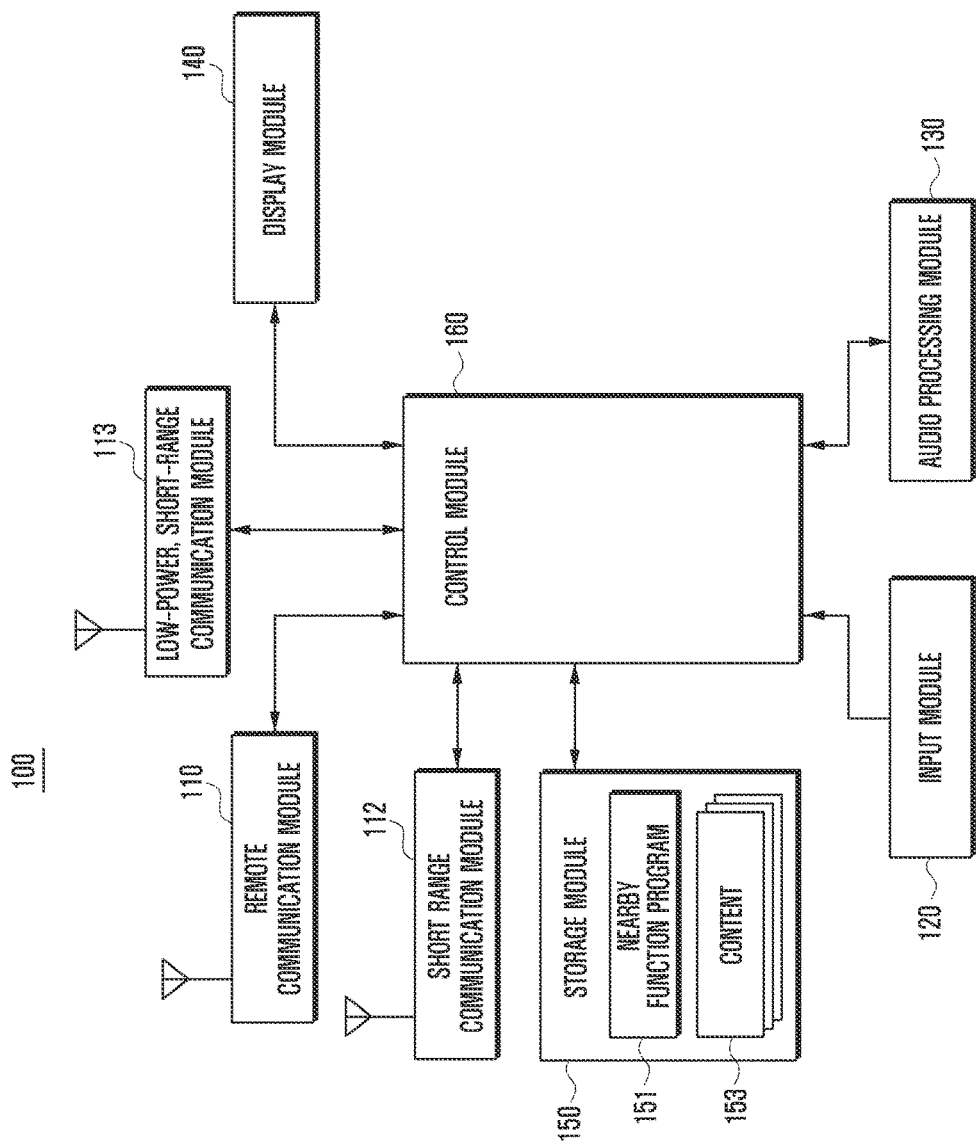
FIG. 2 is a block diagram illustrating an example of a configuration of an electronic device according to an embodiment of the present disclosure.

FIG. 2 is a block diagram illustrating an example of a configuration of a controller module of an electronic device according to an embodiment of the present disclosure. The electronic device is for supporting an operation of a nearby function according to an embodiment of the present disclosure. While the electronic device for operating the nearby function which may be used in the present disclosure may be divided into a transmission-side device and a reception-side device, the transmission-side device may be implemented to operate as the reception-side device as needed, or the reception-side device may be implemented to operate as the transmission-side device. Accordingly, a configuration of a device that can support both the transmission-side device and the reception-side device will be described below. Hereinafter, the transmission-side device or the reception-side device is referred to as an electronic device. Furthermore, a description of a transmission-side function and a reception-side function of the electronic device will be given as needed.

Referring to FIG. 2, an electronic device 100 is illustrated, where the electronic device 100 may include a remote communication module 110, a short range communication module 112, a low-power short-range communication module 113, an input module 120, an audio processing module 130, a display module 140, a storage module 150, and a control module 160.

The electronic device 100 having such configurations, when operating as a transmission-side device, may transmit/receive signals for establishing a control communication channel with a reception-side device using the low-power short-range communication module 113. In addition, the electronic device 100 may establish a control communication channel with the reception-side device using at least one of the remote communication module 110 and the short range communication module 112, and may control the reception-side device.

The electronic device 100, when operating as a reception-side device, may be maintained in a communication standby state using the low-power short-range communication module 113, and may provide advertising information to a transmission-side device in response to a scanning signal of the transmission-side device. Thereafter, the electronic device 100, when receiving a request of the transmission-side device for establishing a control communication channel, may request a user input to identify whether the request is to be permitted. When the user input is entered, the electronic device 100 may establish the control communication channel with the transmission-side electronic device, and may perform a control according to signals transmitted by the transmission-side device or may output/display content transmitted by the transmission-side device.

In this way, the electronic device 100 of the present disclosure may process the operation prior to the establishment of the communication channel based on the low-power short-range communication module 113, thereby reducing power consumption. Furthermore, as described above, the electronic device 100 may scan the nearby devices or the most neighboring devices and establish the communication connection according to operating the white list, using the same protocol, applying the predetermined RSSI range, and the like.

The remote communication module 110 may support a remote communication function of the electronic device 100. The remote communication module 110 may support a communication function based on a network server connection. The remote communication module 110 may include a mobile communication module, an internet communication module, and the like. For example, the remote communication module 110 may be a communication module supporting at least one of various communication methods including a Global System for Mobile communications (GSM), a General Packet Radio Service (GPRS), Code Division Multiple Access (CDMA), Wideband Code Division Multiple Access (WCDMA), Frequency Division Multiple Access (FDMA), and the like. The remote communication module 110 may establish a specific communication channel with a reception-side device scanned by the low-power short-range communication module 113. The communication channel established by the remote communication module 110 may be used as a control communication channel of the electronic device 100.

The short range communication module 112 may support a short range communication function of the electronic device 100. For example, the short range communication module 112 may be a communication module supporting at least one of various communication methods including BT communication, Zigbee communication, Ultra Wide Band (UWB) communication, Long Term Evolution (LTE) direct communication, Wi-Fi direct communication, and the like. Along with the reception-side device 102, the short range communication module 112 may establish a communication channel for content transmission or a control communication channel for control signal transmission/reception. The transmission-side device and the reception-side device may include the short range communication modules 112, respectively, which are compatible with each other.

The low-power short-range communication module 113, while the electronic device operates as the transmission-side device, may scan the reception-side device. For example, the low-power short-range communication module 113 may generate a request for controlling the reception-side device according to user control, or may automatically scan the reception-side device according to pre-defined schedule information. By way of example, the low-power short range communication module 113 may automatically perform a scanning operation when being changed from a sleep state to a wake-up state. When a lock screen is requested to be output/displayed on the display module 140, the low-power short-range communication module 113 may automatically perform a scanning operation. When a standby screen is requested to be output/displayed, the low-power short-range communication module 113 may automatically perform a scanning operation. The scanning operation of the low-power short-range communication module 113 may be controlled according to user configuration, or may be determined according to whether an application icon requiring a scanning operation is to be output/displayed. The low-power short-range communication module 113 may perform at least one of the various scanning operations described above. When advertising information of the reception-side device 102 is collected through the scanning operation of the low-power short range communication module 113, the corresponding advertising information may be provided to the control module 160. After the scanning operation, the low-power short-range communication module 113 may transmit a message for requesting establishment of a control communication channel to the reception-side device according to user control. The low-power short-range communication module 113 may be deactivated when the control communication channel has been established, or the nearby function is requested to be cancelled according to a user request. Meanwhile, the low-power short-range communication module 113, while the electronic device operates as the reception-side device, may be in an activated state or a wake-up state at a predetermined period or in real time.

The low-power short-range communication module 113 may transmit advertising information of the reception-side device. To this end, even when the control module 160 is in a sleep state, the low-power short-range communication module 113 may be in a wake-up state at a predetermined period. An interval of the predetermined period may vary depending on at least one of a movement of the electronic device 100, time, and a place. In order to provide advertising information in response to a scanning operation of the transmission-side device, the low-power short-range communication module 113 may store in advance some pieces of the advertising information, or may have access authority for the storage module 150. At this time, the low-power short-range communication module 113 may be designed to access the storage module 150 without changing the control module 160 to the wake-up state. The low-power short-range communication module 113, when receiving a request for establishing a control communication channel from the transmission-side device after transmitting the advertising information to the transmission-side device, may inform the control module 160 of the request. To this end, the low-power short-range communication module 113, when receiving the request message, may perform an operation of waking up the control module 160.

The input module 120 may generate an input signal of the electronic device 100 according to user control. The input module 120 may include physical keys including at least one key button, a home key, a side key, and the like. The input module 120 may include a touch type input device such as a touch pad, a touch panel, a touch sheet, or the like. Here, the touch type input device may generate an input signal according to a touch of an electronic pen or a general pen as well as a touch of a hand. When the display module 140 is implemented as a touch screen, the input module 120 may include a configuration of the display module 140 as an input device.

The input module 120 may generate various input signals for support of a nearby function. For example, according to user control, the input module 120 may generate an input signal for configuring a nearby function, an input signal for operating specific content or a specific application, an input signal for selecting a nearby function item during an operation of corresponding content and a corresponding application, an input signal for selecting one of collected reception-side devices, and an input signal for controlling a reception-side device for which communication is connected. The input module 120 may generate an input signal for allowing a communication connection request received from the transmission-side device.

The audio processing module 130 may support at least one of outputting and collecting an audio signal related to an operation of the electronic device 100. For example, the audio processing module 130 may output an audio signal stored in the storage module 150 or an audio signal received from other electronic devices. When the electronic device 100 requests the audio processing module 130 to collect an audio signal in the process of supporting a communication function, the audio processing module 130 may collect the audio signal. In the process of supporting the nearby function according to the present disclosure, the audio processing module 130 may output a sound to guide configuration for an operation of the nearby function, a sound to guide that the nearby function can be operated when specific content or a specific application is requested to be activated, a sound to guide that reception-side devices have been scanned in the scanning process, and a guide sound or a sound effect required in the process of transmitting content or a specific control signal to the selected reception-side device. When the electronic device 100 outputs advertising information in response to scanning signals received from the transmission-side device in the process of operating the nearby function, the audio processing module 130 may output a guide sound corresponding to the output/display of the advertising information. When the electronic device 100 receives a request for a communication connection from the transmission-side device, the audio processing module 130 may output a guide sound or a sound effect according to an output/display of a popup window for confirming whether the communication connection is to be permitted, in response to the receiving of the request. The guide sound or the sound effect output by the audio processing module 130 may be omitted according to user control or an intention of a designer.

The display module 140 may output/display various screens according to an operation of the electronic device 100. For example, the display module 140 may output/display a lock screen or a standby screen that is displayed when the electronic device changes from a sleep state to a wake-up state, or an application operation screen according to operating a specific application. When an operation of the nearby function is configured on a specific screen output/display, the display module 140 may output/display information for guiding the configuration state in a status bar area or a predetermined area. Here, the information for guiding the configuration state may be implemented with at least one of a specific image or text. The information for guiding the configuration state displayed in the status bar area may be displayed as a configured indicator, and the information for guiding the configuration state displayed on a side of the screen may be displayed as an icon. The screen associated with the operation of the nearby function, which is output/displayed through the display module 140, will be described in more detail with reference to drawings illustrating examples thereof. Meanwhile, the display module 140 may be provided in the form of a touch screen supporting an input function. To this end, the display module 140 may be provided in the form including a display panel, and a touch panel or a touch sheet.

The storage module 150 may store various pieces of data and programs required for operating the electronic device 100, and data may be generated or received according to an operation of a specific application. The storage module 150 may include a nearby function program 151 and content 153 to support an operation of a nearby function.

The content 153 may include at least one of an image, a text, and an audio file. The image may include a still image such as a photo or a picture, a moving image, and the like which are included in the gallery. The text may include a message, e-mail, a specific document, and the like. The audio file may include a voice recorded file, a music file, and the like. When the electronic device 100 includes a broadcast receiving module, the content 153 may include broadcast information received and recorded. The content 153 may include information on a phone book.

The nearby function program 151 may include at least one routine for supporting a nearby function. For example, the nearby function program 151 may include a routine for configuring a nearby function operation mode, a routine for operating a transmission-side device for a nearby function, and a routine for operating a reception-side device for the nearby function.

The routine for operating the transmission-side device for the nearby function may include a routine to perform a scanning operation at a predetermined point in time during a configuration of the nearby function operation mode, a routine to analyze advertising information collected in response to the scanning operation, a routine to generate a nearby function item based on the analyzed information, and a routine to output/display the nearby function item. The routine for operating the transmission-side device for the nearby function may include a routine to request a communication connection with a reception-side device when selecting the nearby function item, a routine to establish a control communication channel automatically by using a communication module based on a specific protocol when the communication connection with the reception-side device is permitted, and a routine to transmit a control signal or content through the established control communication channel. Among the routines for operating the transmission-side device for the nearby function, the routine to perform the scanning operation may include at least one of a routine to operate a transmission-side white list configured such that only the specific desired reception-side devices configured in advance may be scanned, and a routine to restrict an RSSI range.

The routine for operating the reception-side device for the nearby function may include a routine to stand ready for a scanning signal at a predetermined period, a routine to respond with advertising information when a scanning signal is received, a routine to inform of a request for a communication connection, a routine to transmit, to the transmission-side device, the fact that the communication connection has been permitted and establish a control communication channel with the transmission-side device, and a routine to perform a specific function according to a control signal of the transmission-side device or output/display the received content. The routine for operating the reception-side device for the nearby function may include a routine to operate a reception-side white list for allowing only the pre-defined scanning signal of a specific transmission-side device to be recognized as an effective signal, when standing ready for the scanning signal.

In addition, the storage module 150 may include at least one application. The at least one application may include a nearby function based application. When a request is generated for activating the nearby function based application stored in the storage module 150, the electronic device 100 may activate the corresponding application and perform the routine for operating the transmission-side device for the nearby function.

The control module 160 may transmit/receive signals for operating the electronic device 100, and process data. According to an embodiment, the control module 160 operating in the transmission-side device may automatically perform a scanning operation when configuring the nearby function operation mode to collect advertising information from the reception-side device. When an input signal is generated according to a selection of a specific reception-side device, the control module 160 may perform a communication connection with the corresponding reception-side device based on at least one of communication modules other than the low-power short-range communication module.

Meanwhile, the control module 160 operating in the reception-side device may identify a request message transmitted by the transmission-side device, and may establish a communication channel with the transmission-side device based on a specific communication module according to the request message. At this time, the control module 160 may transmit advertising information based on the low-power short-range communication module 113 in response to the scanning operation. The control module 160 may establish a control communication channel based on a communication module other than the low-power short-range communication module 113.

Figure 3:
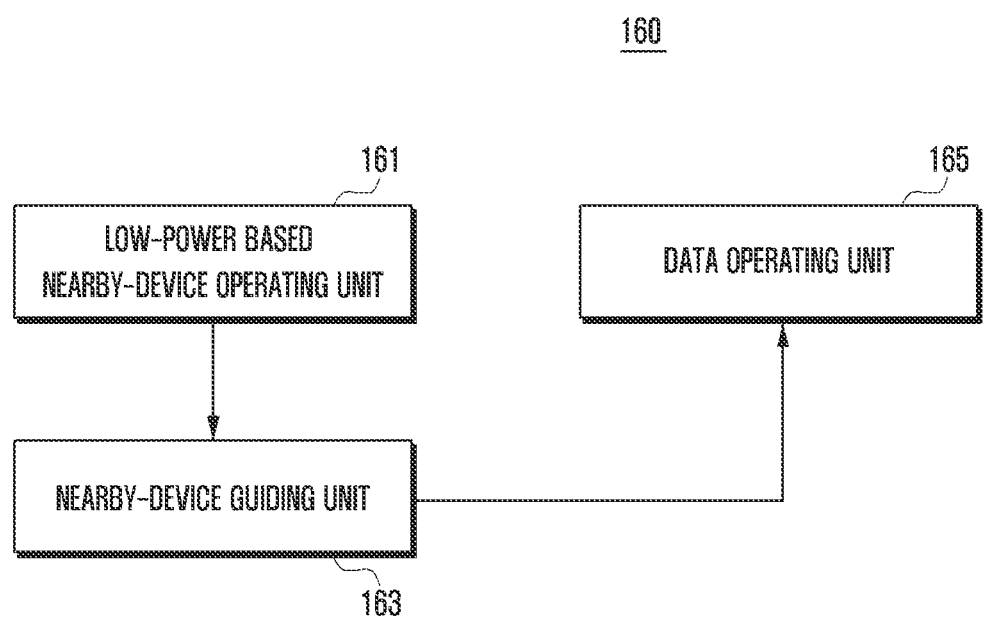
FIG. 3 is a block diagram illustrating an example of a configuration of a control module of an electronic device according to an embodiment of the present disclosure.

FIG. 3 is a block diagram illustrating an example of a configuration of a control module of an electronic device according to an embodiment of the present disclosure.

Referring to FIG. 3, a control module 160 is illustrated, where the control module 160 may include a low-power based nearby-device operating unit 161, a nearby-device guiding unit 163, and a data operating unit 165. The low-power based nearby-device operating unit 161, the nearby-device guiding unit 163, and the data operating unit 165 may be implemented as one of at least one processor, task, and thread. The low-power based nearby-device operating unit 161, the nearby-device guiding unit 163, and the data operating unit 165 may be implemented as at least one of a hardware module, a software module, and a middleware or firmware module.

The low-power based nearby-device operating unit 161 may control an operation of a low-power short-range communication module 113, as illustrated, for example, in FIG. 2. For example, the low-power based nearby-device operating unit 161 may identify whether a nearby function operation mode has been configured. In an operation of a transmission-side device, when the nearby function operation mode has been configured, the low-power based nearby-device operating unit 161 may control a scanning operation and collection of advertising information. The control of the low-power based nearby-device operating unit 161 may control the scanning operation according to the configured schedule information at various points in time. For example, the low-power based nearby-device operating unit 161 may control the scanning operation when a screen is output/displayed according to a selection of specific content, or a specific nearby function based application is activated. The control for the scanning operation may be performed at various points in time such as when a standby screen is output/displayed, when a specific key button is selected, when a lock screen is output, when a lock screen is unlocked, and the like.

In an operation of a reception-side device, the low-power based nearby-device operating unit 161, when receiving a scanning signal, may transmit advertising information to a transmission-side device. The low-power based nearby-device operating unit 161 may identify at least one of a movement of the electronic device 100, as illustrated, for example, in FIG. 2, a current time, and a current place, and may adjust a period at which the low-power based nearby-device operating unit 161 stands ready for receiving the scanning signal. For example, the low-power based nearby-device operating unit 161 may configure the period to be relatively long when there is no movement of the electronic device 100 and to be relatively short when there is a movement of the electronic device 100. The low-power based nearby-device operating unit 161 may configure the period to be relatively long in a particular time zone and to be relatively short in another time zone. The low-power based nearby-device operating unit 161 may configure the period to be relatively long at a particular place and to be relatively short in another specific place.

In the operation of the transmission-side device, when the low-power based nearby-device operating unit 161 collects and transfers the advertising information, the nearby-device guiding unit 163 may create a nearby function item or select a nearby function item created in advance, based on the transferred advertising information. The nearby-device guiding unit 163 may make a control such that the nearby function item is output/displayed on the display module 140. The nearby-device guiding unit 163 may output/display the nearby function item in various forms such as a specific icon form, a list or thumbnail form, a popup window form, and the like.

In the operation of the reception-side device, the nearby-device guiding unit 163, when receiving a request message for a communication connection, may output/display a message for notifying that the request message has been received. When an input signal for allowing the communication connection is generated according to user control, the nearby-device guiding unit 163 may transmit the input signal to the transmission-side device based on the low-power short range communication module 113.

The data operating unit 165 may process the request message for the communication connection. That is, when the request message for the communication connection is not designed to be transmitted to the low-power short-range communication module 113, the data operating unit 165 may transmit the request message for the communication connection through a communication module other than the low-power short-range communication module 113, for example, through the short range communication module 112 of the transmission-side device. The data operating unit 165 of the reception-side device may transmit a response according to the reception of the request message for the communication connection through the short range communication module 112 of the reception-side device. When the communication connection is established between the transmission-side device and the reception-side device, the data operating unit 165 may make a control such that a control signal or specific content is transmitted from the transmission-side device to the reception-side device. The data operating unit 165 may control an operation of the device according to the control signal provided from the transmission-side device, or may control an output/display according to the received content.

Figure 4A:
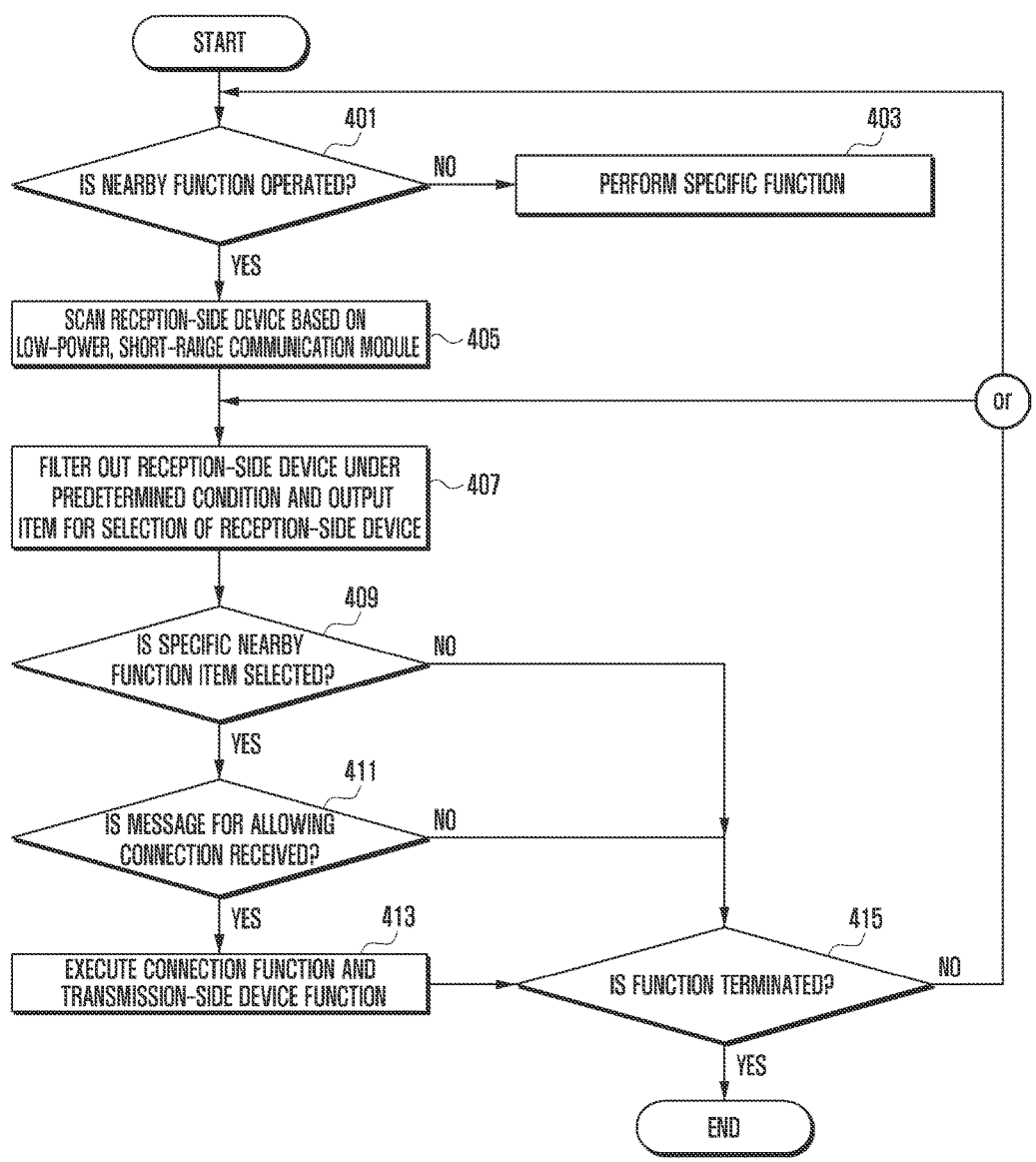
FIGS. 4A and 4B are flowcharts illustrating a method of operating a nearby function according to various embodiments of the present disclosure.
Figure 4B:
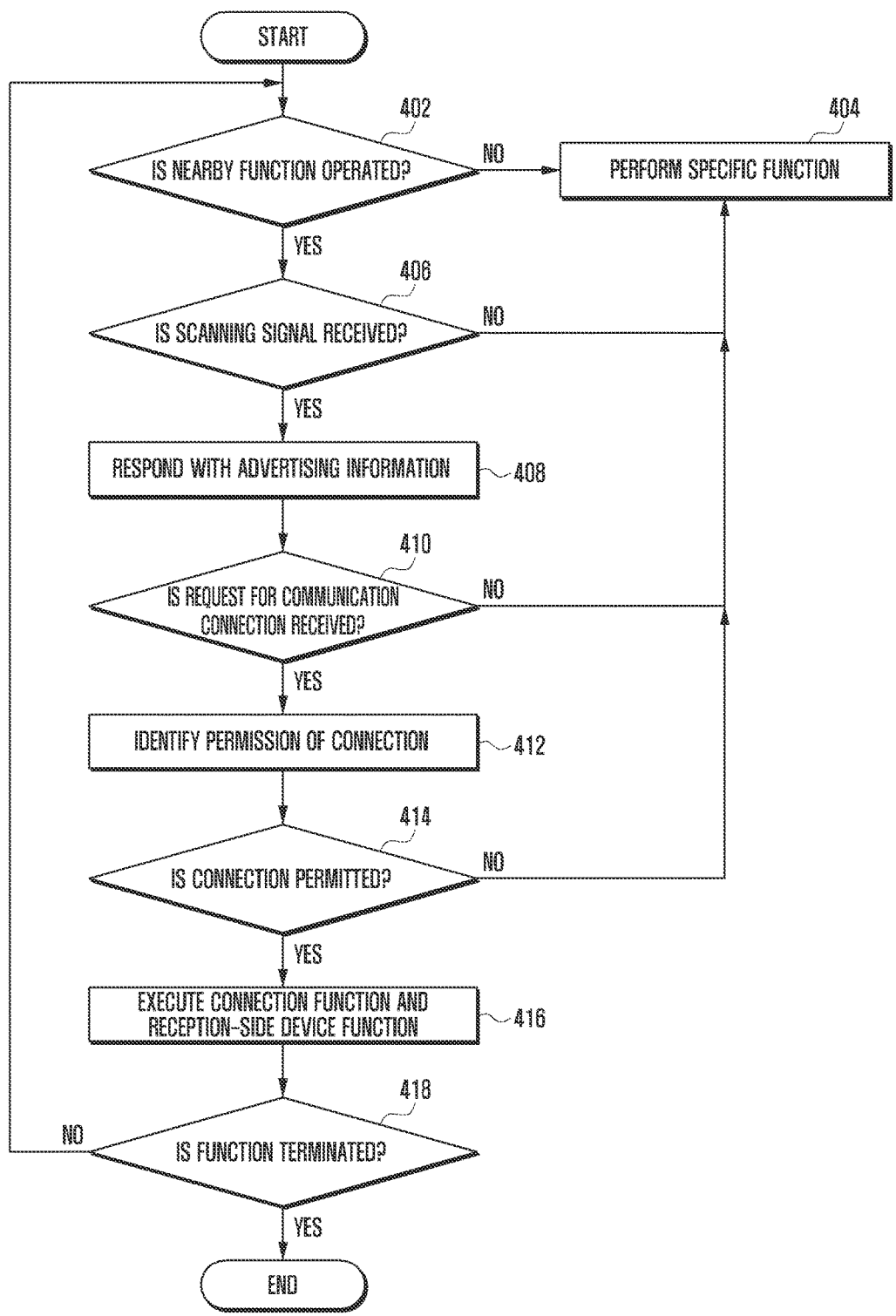

FIGS. 4A and 4B are flowcharts illustrating a method of operating a nearby function according to various embodiments of the present disclosure. Specifically, FIG. 4A is a flowchart illustrating a method of operating a nearby function in a transmission-side electronic device according to an embodiment of the present disclosure and FIG. 4B is a flowchart illustrating a method of operating a nearby function in a reception-side electronic device according to an embodiment of the present disclosure.

Referring to FIG. 4A, a flowchart is illustrated, such that in operation 401, a control module 160 may identify whether a nearby function operation mode has been configured for a transmission-side electronic device 100 or whether an event for operating the nearby function has occurred (e.g., operation 401 may identify whether or not a nearby function has been operated). When there is no configuration or event for operating the nearby function in operation 401 (e.g., the nearby function has not been operated), the control module 160 may proceed to operation 403 to perform a specific function according to an occurring event or a function according to schedule information. For example, the control module 160 may support functions of the electronic device 100 including a file editing function, a web access function, a photo searching function, a camera operating function, and the like, and may perform a function according to a user request.

When it is determined in operation 401 that the nearby function operation mode has been configured or the event for operating the nearby function has occurred (e.g., the nearby function has been operated), the control module 160 may scan at least one reception-side device based on a low-power short-range communication module 113 in operation 405. In this operation, the control module 160 may transmit a scanning signal. At this time, the control module 160, while designating an RSSI range as a predetermined range, may transmit the scanning signal.

When advertising information is collected from the at least one reception-side device, the control module 160 may perform a filtering operation on the reception-side device under a predetermined condition in operation 407. That is, the control module 160 may filter out only the predetermined type of reception-side device desired to be scanned, based on a previously defined transmission-side white list. Furthermore, the control module 160 may control an output/display of an item for a selection of the reception-side device. At this time, the control module 160 may make a control to output/display a nearby function item corresponding to the at least one reception-side device in a predetermined form such as an icon form, a list form, a multi-thumbnail form, a popup window form, or the like.

In operation 409, the control module 160 may identify whether an input event occurs for a selection of a specific nearby function item. When it is determined that the input event has occurred for the selection of the specific nearby function item (i.e., YES in operation 409), the control module 160 may transmit a request message for a communication connection to the reception-side device corresponding to the selected nearby function item, and then proceed to operation 411, where the control module 160 may identify whether a message for allowing the communication connection is received from the reception-side device. The control module 160, when receiving the message for allowing the communication connection, may control execution of a connection function and a function of the transmission-side device in operation 413.

Meanwhile, when the specific nearby function item is not selected for a predetermined period of time or a cancellation event occurs in operation 409 (i.e., NO in operation 409), the control module 160 proceeds to operation 415 to identify whether an event for termination of the function occurs.

Further, when a connection rejection message is not received in operation 411 (i.e., NO in operation 411), the control module 160 proceeds to operation 415 to identify whether the event for termination of the function occurs. Additionally, after the execution of the connection function and the function of the transmission-side device is controlled in operation 413, the control module 160 proceeds to operation 415 to identify whether the event for termination of the function occurs. When there is no event for termination of the function (i.e., NO in operation 415), the control module 160 may return to operation 407 to maintain the nearby function item output, or may return to operation 401 to perform the above-described operations again. When there is an event for termination of the function (i.e., YES in operation 415), the method of operating the nearby function ends.

Referring to FIG. 4B, a flowchart is illustrated, such that in operation 402, a control module 160 may identify whether a nearby function operation mode has been configured for a reception-side electronic device 100 (e.g., operation 402 may identify whether or not a nearby function has been operated). When there is no configuration for operating the nearby function in operation 402 (i.e., NO in operation 402), the control module 160 may proceed to operation 404 to control execution of a specific function of the reception-side device.

Meanwhile, when it is determined in operation 402 that the nearby function operation mode has been configured (i.e., YES in operation 402), the control module 160 may stand ready for a scanning signal at a predetermined period and proceed to operation 406, where the control module 160 may identify whether the scanning signal is received. When it is determined that the scanning signal has not been received, the control module 160 may proceed to operation 404 to perform the specific function of the reception-side device, for example, the function according to a user request, or to maintain the reception-side device in the sleep state.

When it is determined in operation 406 that the scanning signal has been received, the control module 160 may respond with previously defined advertising information in response to the scanning signal in operation 408. At this time, the advertising information may include identification information of the reception-side device, information on the type of function that the reception-side device can support, and the like. In operation 406, the control module 160 may support an operation/utilization of a reception-side white list. That is, the control module 160 may make a control to neglect a scanning signal of a specific transmission-side device according to the operation of the previously defined white list and not to respond with separate advertising information.

Next, in operation 410, the control module 160 may identify whether a request for a communication connection is received. The control module 160, when not receiving the request for the communication connection within a predetermined period of time after the response with the advertising information, may proceed to operation 404 to perform the specific function. Meanwhile, when the request for the communication connection is received within the predetermined period of time in operation 410, the control module 160 may identify permission for the communication connection in operation 412. To this end, the control module 160 may make a control to output/display a popup window for confirming the permission for the communication connection on the display module 140.

When an input event for allowing the connection does not occur for a predetermined period of time or an input event for rejecting the connection occurs in operation 414 (i.e., NO in operation 414), the control module 160 may proceed to operation 404. Meanwhile, when the input event for allowing the connection occurs (i.e., YES in operation 414), the control module 160 may perform the communication connection with the transmission-side device and control execution of a function of the reception-side device in operation 416. At this time, the control module 160 may deactivate a low-power short-range communication module 113, and may perform the communication connection using at least one of a short range communication module 112 and a remote communication module 110. In addition, the control module 160 may make a control to execute a specific function according to a control signal transmitted from the transmission-side device or to receive and output/display content transmitted by the transmission-side device.

Next, in operation 418, the control module 160 may identify whether an event for termination of the function occurs (e.g., identify whether the event has been terminated). When there is no event for termination of the function (i.e., NO in operation 418), the control module 160 may maintain the operation state in operation 416, or may return to operation 402 to perform the above-described operations again. When the event is terminated (i.e., YES in operation 418), the method of operating the nearby function ends.

FIG. 5 illustrates an example of a screen for explaining a situation in which a nearby function is operated in an electronic device according to an embodiment of the present disclosure.

Referring to FIG. 5, an electronic device 100, when operating as a transmission-side device, is illustrated, where the electronic device 100 may output/display a screen for searching for specific content, for example, video content according to user control as illustrated in <501> of FIG. 5. When an application for executing a video is configured for an operation of a nearby function, the electronic device 100 may scan surrounding reception-side devices based on a low-power short-range communication module 113 at a point in time when video content is requested to be searched for or at a point in time when specific video content is requested to be reproduced. At this time, the electronic device 100 may scan the surrounding reception-side devices by restricting a range of RSSI. The electronic device 100 may automatically select the most neighboring of the scanned reception-side devices. For example, the electronic device 100 may select a reception-side device having the best RSSI as a default. The electronic device 100 may transmit a message for requesting a communication connection to the reception-side device selected as the default. Meanwhile, the electronic device 100 may output/display a nearby function item 510 for the most neighboring device scanned in a status bar area. Here, the nearby function item 510 may be replaced by not only an indicator form output/displayed in the status bar area but also an icon or text form containing a name of the most neighboring device, the type of service supported through the most neighboring device, information on a service description, or the like. Without automatically establishing the communication connection, the electronic device 100 may also transmit the request message for the communication connection when an event for a selection of the nearby function item 510 occurs.

The electronic device 100, when receiving permission for the communication connection from the reception-side device, may output/display a confirmation window 520 for confirming whether to transmit video content requested by a user or specific video content selected as a default, as illustrated in <502> of FIG. 5.

When the user confirms the transmission of the video content in the confirmation window 520, the electronic device 100 may transmit the video content to the reception-side device selected as the most neighboring device. The electronic device 100, when the video content is completely transmitted, may reproduce the selected video content and output/display it on a display module 140 as illustrated in <503> of FIG. 5.

Meanwhile, the reception-side device, when completely receiving the video content from the transmission-side device, may reproduce the corresponding video content according to user control or automatically. As a result, the reception-side device may output/display, through a display module, a screen on which the same video content as in the transmission-side device is displayed.

FIG. 6 illustrates examples of a screen for explaining a display of a nearby function item for each reception-side device according to an embodiment of the present disclosure.

Referring to FIG. 6, an electronic device 100 is illustrated, where, in a transmission-side operation, the electronic device 100 may activate a nearby function operation mode according to previously configured schedule information when a gallery function is requested to be activated. To this end, the electronic device 100 may activate the nearby function operation mode as a default or according to user configuration when activating the gallery function. Furthermore, the electronic device 100 may enter the nearby function operation mode when an event for activating the nearby function operation mode occurs after the gallery function is activated.

When the activation of the nearby function operation mode is requested, the electronic device 100 may control a scanning operation using a low-power short-range communication module 113, as illustrated in FIG. 2. The electronic device 100, when at least one reception-side device near the electronic device 100 is scanned, may output/display a nearby function item 610, through which a nearby function may be performed based on the scanned reception-side device, on a side of a screen thereof On the screen illustrated in <601> of FIG. 6, the nearby function item 610 is disposed in a predetermined area below the status bar area. However, the operation screen of the electronic device 100 according to the present disclosure is not limited thereto. That is, the nearby function item 610 may be output/displayed in the form of a popup on a side of the screen or in another area. The electronic device 100, when failing to scan a reception-side device in the process of scanning surroundings, may not output/display the nearby function item 610. When the electronic device 100 performs a scanning operation at a predetermined period or according to a user request, and thus, a specific reception-side device is scanned according to the scanning operation, the electronic device 100 may output/display the nearby function item 610. Meanwhile, the electronic device 100 outputs/displays the nearby function item 610 as a default, in which case, if there is no scanned reception-side device, the electronic device 100 may output a guide sound, display a popup window, or display a message for announcing that there is no connected reception-side device, when the nearby function item 610 is selected. When a plurality of reception-side devices are scanned in the scanning process, the electronic device 100 may select only the most neighboring device, and may output/display the nearby function item 610 for the most neighboring device as illustrated in <601> of FIG. 6. The most neighboring device may be determined by strength of the received wireless signal or collection of position information of the devices.

Furthermore, when a plurality of reception-side devices provide advertising information in the scanning process, the electronic device 100 may output/display a nearby function item list 620 for the plurality of reception-side devices as illustrated in <602> of FIG. 6. The nearby function item list 620 may include items corresponding to the plurality of reception-side devices, the items created based on the advertising information. For example, when there are more items than can be displayed in a window having a pre-defined size, the electronic device 100 may output/display only a predetermined number of items, and may provide an item "See all" for the un-displayed items. When the item "See all" is selected, the electronic device 100 may output/display a list screen containing all items for the scanned reception-side devices. Furthermore, the electronic device 100 may extend the current nearby function item list 620 and then, additionally display the un-displayed items in the extended area.

Meanwhile, among the items contained in the nearby function item list 620, a specific item may support a multi-service. Accordingly, when a multi-service support item 621 is selected from the nearby function item list 620, the electronic device 100 may output/display an auxiliary list 630 corresponding to the multi-service support item 621 as illustrated in <603> of FIG. 6. In the drawing, the auxiliary list 630 containing a file transfer item and a mirroring item is output/display according to a selection of a smart TV item.

As described above, the electronic device 100 of the present disclosure, when entering the nearby function operation mode, may display the scanned reception-side devices, thereby directly guiding the devices to which a user may transmit specific content. Accordingly, the user may identify the reception-side device to which his/her content is transmitted and then determine content transmission, thereby more intuitively performing function control.

Figure 7:
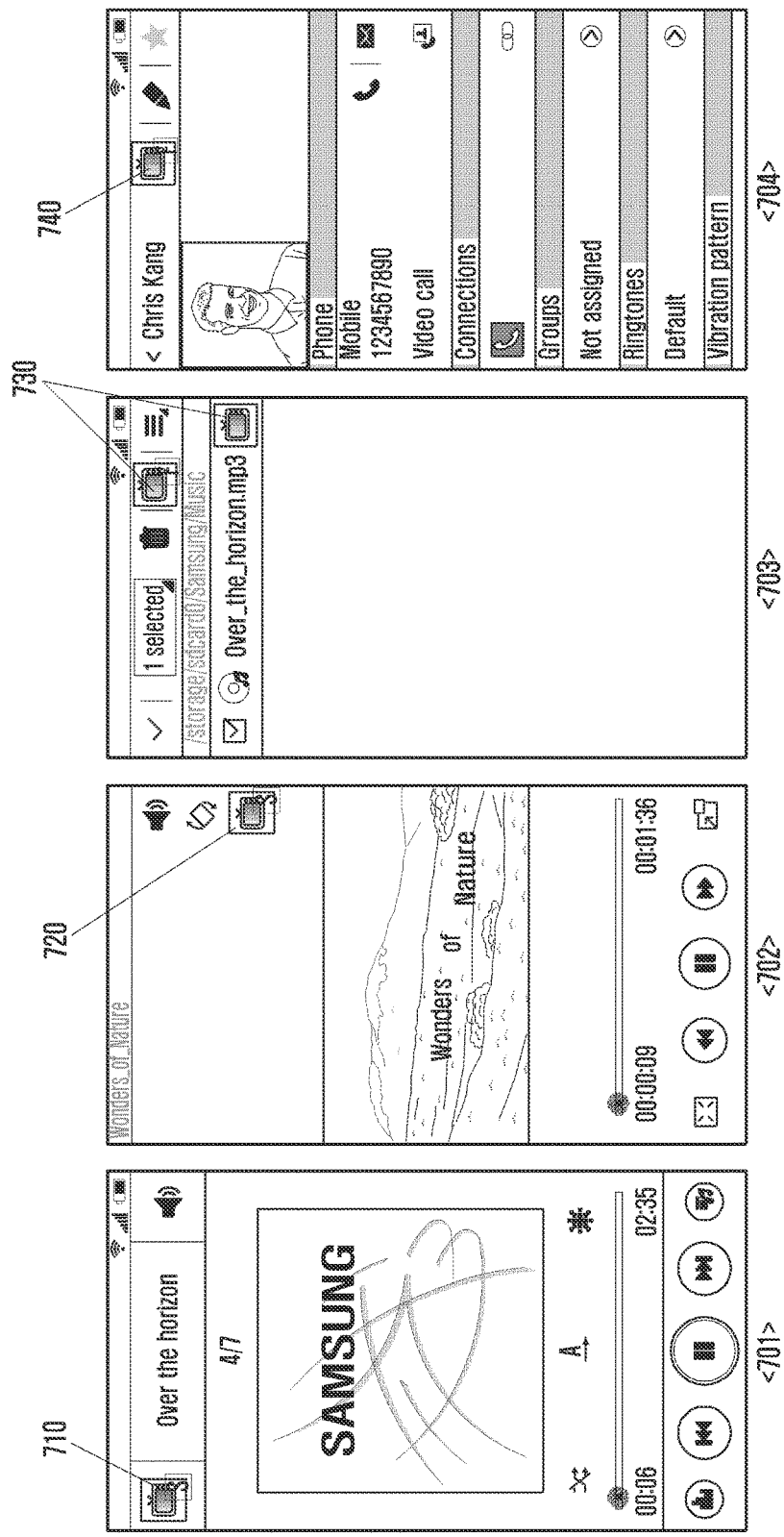
FIG. 7 illustrates examples of a screen for explaining a display of a nearby function item for each application according to an embodiment of the present disclosure.

FIG. 7 illustrates examples of a screen for explaining a display of a nearby function item for each application according to an embodiment of the present disclosure.

Referring to FIG. 7, an electronic device 100, as illustrated in, for example, FIG. 6, when activating a specific function to which activation of a nearby function operation mode is linked, may automatically scan reception-side devices, and may output/display nearby function items corresponding to the scanned reception-side devices. According to an embodiment, the electronic device 100, when an event occurs for requesting reproduction of a music file, may identify whether the corresponding application is an application configured to enter the nearby function operation mode. When the corresponding application is an application required to enter the nearby function operation mode, the electronic device 100 may perform a scanning operation based on a low-power short-range communication module 113, as illustrated in FIG. 2, at a point in time when the reproduction of the music file is requested. When at least one reception-side device is scanned, the electronic device 100 may display a music file reproduction application screen, and in addition, may output/display a music application related nearby function item 710 in a predetermined area as illustrated in <701> of FIG. 7. Although the music application related nearby function item 710 is disposed on an upper left side of the screen, the embodiment of the present disclosure is not limited thereto.

When there exists advertising information for a plurality of reception-side devices which has been collected in the process of scanning the reception-side devices, the electronic device 100 may select the most neighboring device from among the plurality of reception-side devices. Here, the most neighboring device may be a reception-side device that can cooperate with the electronic device 100 in the reproduction of the music file, for example, a device having an audio output function. When the reception-side device related to the music application is completely selected, the electronic device 100 may output/display the music application related nearby function item 710 for the reception-side device on a side of the screen. When a user selects the music application related nearby function item 710, the electronic device 100 may transmit an audio signal according to the reproduction of the music file to the most neighboring device corresponding to the music application related nearby function item 710. In this operation, the electronic device 100 may deactivate the low-power short-range communication module 113, and may establish a communication channel with the reception-side device using at least one of a remote communication module 110, as illustrated in FIG. 2, and a short range communication module 112, as illustrated in FIG. 2. At this time, the electronic device 110 may determine a selection of a communication module and a protocol, which are compatible, with the reception-side device. Furthermore, the electronic device 100 may support the selection of the communication module and the protocol according to a priority. For example, the electronic device 100 may preferentially determine whether the communication channel with the reception-side device can be established using the short range communication modules 112. When it is impossible to establish the communication channel through the short range communication modules 112, the electronic device 100 may establish a communication channel using the remote communication module 110. Although the electronic device 100 may output the audio signal according to the reproduction of the music file while outputting the audio signal to the reception-side device, the electronic device 100 may also omit the output according to user configuration.

According to an embodiment, the electronic device 100, when an event occurs for requesting reproduction of a music file, may identify whether the corresponding application is an application configured to enter the nearby function operation mode. When the corresponding application is an application required to enter the nearby function operation mode, the electronic device 100 may perform a scanning operation based on the low-power short-range communication module 113 at a point in time when the reproduction of the video file is requested. When at least one reception-side device is scanned, the electronic device 100 may display a video file reproduction application screen, and in addition, may output/display a video application related nearby function item 720 in a predetermined area as illustrated in <702> of FIG. 7. In this operation, the electronic device 100 may collect advertising information of only the reception-side devices that can cooperate with the electronic device 100 in the reproduction of the video file. Furthermore, the electronic device 100 may output/display the video application related nearby function item 720 for the most neighboring of the scanned reception-side devices.

The electronic device 100, when configured to provide a plurality of reception-side devices, may provide a list containing items of the plurality of reception-side devices as illustrated in <602> of FIG. 6 after outputting/displaying the video application related nearby function item 720. When an input event occurs for selecting the video application related nearby function item 720, the electronic device 100 may establish a communication connection with the reception-side device corresponding to the corresponding item and transmit video data to the reception-side device. At this time, the electronic device 100 may maintain the output/display of the video application screen, or may stop the output/display of the video application screen according to a user's configuration or request. The electronic device 100, although stopping the output/display of the video application screen, may also output/display a control screen for the reproduction of the video application on a display module 140, as illustrated in FIG. 2.

According to another embodiment, the electronic device 100, when an event occurs for requesting a display of stored files, may perform a scanning operation based on the low-power short-range communication module 113 at the point in time when the display of the stored files is requested. When at least one reception-side device is scanned, the electronic device 100 may display a stored-file display screen, and in addition, may output/display a stored-file related nearby function item 730 in a predetermined area as illustrated in <703> of FIG. 7.

In this operation, the electronic device 100 may scan the reception-side device according to characteristics of the stored files. For example, the electronic device 100, when collecting advertising information that reception-side devices provide according to the scanning operation, may identify the type of functions that the reception-side devices support, based on the advertising information. To this end, the reception-side devices may provide function support information in the process of providing the advertising information.

The electronic device 100 may output/display the stored-file related nearby function item 730 based on the collected advertising information and the stored files. At this time, the electronic device 100 may output/display the stored-file related nearby function item 730 for each of the stored files. Furthermore, the electronic device 100 may output/display the stored-file related nearby function item 730 corresponding to a reception-side device that may establish a communication connection with a specific stored file designated as a default or by a user on the stored-file display screen. That is, the electronic device 100 may create and output/display at least one stored-file related nearby function item 730 corresponding to at least one stored file. When a plurality of stored files has different types so that they are required to establish communication connections with different reception-side devices, the electronic device 100 may output/display stored-file related nearby function items 730 corresponding to the respective types of reception-side electronic devices. At this time, the electronic device 100 may differently dispose the stored-file related nearby function items 730 according to the list in which the stored files are displayed, without disposing them on an upper side of the screen.

According to another embodiment, the electronic device 100, when an event occurs for requesting a display of phone-book information, may perform a scanning operation based on the low-power short-range communication module 113 at the point in time when the display of the phone-book information is requested. When at least one reception-side device is scanned, the electronic device 100 may display a phone-book information display screen, and in addition, may output/display a phone-book information related nearby function item 740 in a predetermined area as illustrated in <704> of FIG. 7.

In this operation, the electronic device 100 may output/display the phone-book information related nearby function item 740 corresponding to a reception-side device that may recognize and display the phone-book information. To this end, the electronic device 100 may select the reception-side device capable of displaying the phone-book information among the reception-side devices identified through the scanning operation, and may output/display the phone-book information related nearby function item 740 through which a communication connection with the corresponding reception-side device can be established.

Meanwhile, the electronic device 100 may configure another electronic device recorded in specific phone-book information as a white list, and in the scanning operation, may identify whether there is a reception-side device corresponding to the other electronic device. When there exists the reception-side device corresponding to the phone-book information, the electronic device 100 may output/display the phone-book information related nearby function item 740 through which a communication connection with the reception-side device can be established.

FIG. 8 illustrates examples of a screen for explaining a display of a nearby function item according to an embodiment of the present disclosure.

Referring to FIG. 8, an electronic device 100, as illustrated in, for example, FIG. 6 may provide a nearby function item 810 in an icon form as illustrated in <801> of FIG. 8. The electronic device 100, when requested to display a standby screen or an icon screen, may perform a scanning operation based on a low-power short-range communication module 113, as illustrated in FIG. 2, to collect advertising information of reception-side devices, and may output/display the nearby function item 810 based on the collected advertising information. At this time, the electronic device 100 may output/display the nearby function item 810 corresponding to a most neighboring reception-side device, or may output/display the nearby function item 810 corresponding to a reception-side device having a specific device name defined in advance or supporting a specific function. When a user selects the nearby function item 810, the electronic device 100 may establish a communication connection with the reception-side device corresponding to the corresponding nearby function item 810.

The electronic device 100 may output/display a nearby function item window 820 containing a plurality of nearby function items as illustrated in <802> of FIG. 8. When a specific event occurs for requesting an output/display of the nearby function item window 820, for example, when an input event to press a home key button or a specific key button occurs, the electronic device 100 may perform a scanning operation. Based on collected advertising information of reception-side devices, the electronic device 100 may output/display the nearby function item window 820 containing the plurality of nearby function items as illustrated. The electronic device 100, when a cancellation event occurs, may remove the nearby function item window 820. In this way, the electronic device 100 may activate a nearby function operation mode according to the occurrence of the specific event to output/display the nearby function item window 820 containing at least one nearby function item based on the low-power short-range communication module 113. Furthermore, the electronic device 100 may deactivate a transmission-side function of the low-power short-range communication module 113 according to the occurrence of the specific event. Meanwhile, image icons having a name of the neighboring devices are output/displayed in the nearby function item window 820, and yet the embodiments of the present disclosure are not limited thereto. For example, the nearby function item window 820 may also contain icons or texts having information for a description of the devices, a type of service provided by the devices, information for a description of service provided by the devices as well as the name of the neighboring devices.

The electronic device 100 may output/display at least one of nearby function items 830 on a lock screen as illustrated in <803> of FIG. 8. To this end, the electronic device 100, when an input event occurs for calling the lock screen, may perform a scanning operation and output/display the at least one of the nearby function items 830 on a side of the screen based on advertising information of the scanned reception-side devices. Here, when a specific one of the nearby function items 830 is designated, and a pre-defined gesture event is received, the electronic device 100 may establish a communication connection with a reception-side device corresponding to the designated nearby function item. The pre-defined gesture event may be an event for unlocking the lock screen. Meanwhile, the at least one of the nearby function items 830 is illustrated in a form of an image icon having a particular name, and yet the present disclosure is not limited thereto. For example, the at least one of the nearby function items 830 may be output/displayed in the form of information on a service type supported by the corresponding device, information for a description of the service, and an image associated with the corresponding service, or in a text form. For example, the at least one of the nearby function items 830 may also be provided as a list containing text items.

FIG. 9 illustrates an example of a nearby function for each of reception-side devices according to an embodiment of the present disclosure.

Referring to FIG. 9, a service list and a default service is listed for each device category of reception-side devices. Specifically, as illustrated in FIG. 9, reception-side devices of, for example, various device categories, may support a specific communication connection function according to types thereof. For example, a smart phone may be a reception-side device that may support a file transfer function, a tethering function, and a multi-game function. The smart phone may have been configured to support the file transfer function as a default. The configuration of the default service may be changed according to user control. An electronic device 100, as illustrated for example in FIG. 6, when the smart phone is scanned as a reception-side device, may output/display a nearby function item for informing that the aforementioned file transfer function can be performed. For example, the nearby function item may include an icon or an image corresponding to the smart phone, and a character "F" representing the file transfer function may be included in the corresponding icon or image. Furthermore, for example, a character "T" may represent the tethering function and a character "G" may represent the multi-game function.

According to another embodiment, a smart TV may be a reception-side device that supports a file transfer function, a mirroring function, a streaming function, and a Digital Living Network Alliance (DLNA) function. A character "M" may represent the mirroring function, a character "S" may represent the streaming function and a character "D" may represent the DLNA function. At this time, the smart TV may have been configured to support the mirroring function as a default, and the mirroring function may be changed to another function according to a change in user configuration. At this time, the configuration change of the mirroring function may be performed through a communication connection with the electronic device 100, and may also be performed through a manipulation of the smart TV.

According to another embodiment, the reception-side devices may include a tablet electronic device, a PC device, a printer, a camera device, a car-kit device, an accessory device such as a headset or a keyboard, and other devices. Each of the reception-side devices may have supportable service items, may support additional functions such as remote preview, which may be represented by a character "R," BT connect, which may be represented by a character "C," and Classic BT connect via BLE, which also may be represented by the character "C," and may be an allocated service configuration that can be provided. According to a scanning operation of the electronic device 100, the reception-side device may provide advertising information to the electronic device 100, the advertising information including at least one of device identification information such as a device name, information on the aforementioned service items, and currently configured service configuration information.

As described above, in the method of operating the nearby function and the electronic device supporting the same according to the embodiments of the present disclosure, the neighboring reception-side devices are scanned based on the low-power short-range communication module, and the communication connection is established based on other communication modules, thereby making it possible to reduce power consumption. In addition, the present disclosure can provide various types of screen interfaces to allow a user to select and use useful reception-side devices more intuitively.

Meanwhile, the above-described electronic device may further include various additional modules according to a form of implementation thereof. That is, when the electronic device is a communication device, the electronic device may further include elements which have not been described above, such as a short-range communication module for short-range communication, an interface for transmitting and receiving data in a wired communication scheme or a wireless communication scheme of the electronic device, an internet communication module for communicating with an internet network and performing an internet function, a digital broadcasting module for performing a function of receiving and reproducing a digital broadcast signal and the like. These elements may be variously modified according to the convergence trend of digital devices, and cannot be all enumerated. However, the electronic device 100 may further include elements equivalent to the above-described elements. Also, it goes without saying that, in the electronic device, a particular configuration may be excluded from the above-described configuration or may be replaced by another configuration according to embodiments of the present disclosure. This may be easily understood by those skilled in the art to which the present disclosure pertains.

Also, examples of the electronic device according to embodiments of the present disclosure may include all types of information communication devices, all types of multimedia devices, and application devices for all types of the information communication devices and all types of the multimedia devices, such as all mobile communication terminals operating based on communication protocols matched to various communication systems, a PMP, a digital broadcast player, a PDA, a music player (e.g., an MP3 player), a portable game console, a smart phone, a laptop computer, a handheld PC, and the like.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
a low-power short-range transceiver configured to:
perform a scanning operation, and
collect advertising information as a result of the scanning operation;
a display configured to display at least one item for requesting a communication connection with at least one reception-side device corresponding to the collected advertising information;
at least one processor configured to:
control the scanning operation of the low-power short-range transceiver,
control the displaying of the at least one item for requesting a connection with the at least one reception-side device indicating the collected advertising information, and
in response to selection of the item:
establish a communication connection with a reception-side device corresponding to the selected item, and
control execution of a function of a plurality of functions in the reception-side device corresponding to the item; and
at least one of a short-range transceiver or a remote transceiver configured to establish the communication connection with the at least one reception-side device according to a selection of the item,
wherein the at least one processor is further configured to deactivate the low-power short-range communication transceiver when the communication connection using at least one of a short-range communication connection and a remote communication connection is established.

2. The electronic device of claim 1, wherein the display is further configured to display an item indicating a most neighboring reception-side device.

3. The electronic device of claim 1, wherein the display is further configured to display an item list or an item window containing items indicating a plurality of reception-side devices.

4. The electronic device of claim 1, wherein the display is further configured to display the at least one item as an icon of a standby screen.

5. The electronic device of claim 1, wherein the display is further configured to display the at least one item as an icon of a lock screen.

6. The electronic device of claim 5, wherein the at least one processor is further configured to control the communication connection with a reception-side device corresponding to the selected item when an event for selecting the item and an event for unlocking the lock screen occur.

7. The electronic device of claim 1, further comprising:
an input interface configured to generate an input event for performing the scanning operation,
wherein the at least one processor is further configured to control the scanning operation and the collecting of the advertising information when the input event occurs for requesting the scanning operation.

8. The electronic device of claim 1, wherein the display is further configured to display an item containing at least one of an image or a text corresponding to a nearby function that the at least one reception-side device is to support.

9. A method of an electronic device for operating a nearby function, the method comprising:
performing, by a low-power short-range transceiver of the electronic device, a scanning operation;
collecting advertising information as a result of the scanning operation;
displaying at least one item for requesting a communication connection with at least one reception-side device corresponding to the collected advertising information; and
in response to selection of the item:
establishing a communication connection with a reception-side device corresponding to the selected item; and
controlling execution of a function in the reception-side device corresponding to the selected item,
wherein the establishing of the communication connection comprises establishing the communication connection with the reception-side device corresponding to the selected item based on at least one of a short-range communication transceiver or a remote communication transceiver, and
wherein the method further comprises deactivating the low-power short-range transceiver during the performing of the communication connection.

10. The method of claim 9, wherein the displaying of the at least one item comprises at least one of:
displaying an item indicating a most neighboring reception-side device; or
displaying an item list or an item window containing items indicating a plurality of reception-side devices.

11. The method of claim 9, wherein the displaying of the at least one item comprises at least one of:
displaying the at least one item as an icon of a standby screen by performing the collecting of the advertising information when a request for displaying the standby screen is made; or
displaying the at least one item on a side of a lock screen by performing the collecting of the advertising information when a request for displaying the lock screen is made.

12. The method of claim 11, further comprising:
receiving an event for selecting a specific item displayed on the lock screen and an event for unlocking the lock screen; and
performing the communication connection with a reception-side device corresponding to the item along with the unlocking of the lock screen.

13. The method of claim 9, wherein the displaying of the at least one item comprises at least one of:
collecting advertising information of a reception-side device that is to cooperate with a music reproduction function, by performing the scanning operation, and displaying a music application related item based on the collected advertising information, when a request for reproducing music is received;
collecting advertising information of a reception-side device that is to cooperate with a video reproduction function, by performing the scanning operation, and displaying a video application related item based on the collected advertising information, when a request for reproducing a video is received;
collecting advertising information of a reception-side device that is to cooperate with a stored file, by performing the scanning operation, and displaying a stored-file related item based on the collected advertising information, when a request for displaying the stored file is received; or
collecting advertising information of a reception-side device that is to display phone-book information, by performing the scanning operation, and displaying a phone-book information related item based on the collected advertising information, when a request for displaying the phone-book information is received.

14. The method of claim 9, wherein the displaying of the at least one item comprises displaying an item containing at least one of an image or a text corresponding to a nearby function that the at least one reception-side device is to support.

15. The method of claim 14, wherein the nearby function is at least one of a file transfer function, a tethering function, a multi-game function, a mirroring function, a streaming function, a digital living network alliance (DLNA) function, a remote preview function or a bluetooth connect function.

16. The method of claim 9, further comprising:
identifying the at least one reception-side device by filtering out a reception-side device of a plurality of reception-side devices according to a predetermined condition; and
identifying the at least one reception-side device from the remaining reception-side devices of the plurality of reception-side devices.

* * * * *